(12) United States Patent
Brown et al.

(10) Patent No.: US 7,408,003 B2
(45) Date of Patent: *Aug. 5, 2008

(54) PIGMENTED POLYMER COMPOSITION

(75) Inventors: Ward Thomas Brown, North Wales, PA (US); Antony Keith Van Dyk, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/730,353

(22) Filed: Dec. 8, 2003

(65) Prior Publication Data

US 2004/0122131 A1 Jun. 24, 2004

Related U.S. Application Data

(60) Provisional application No. 60/435,013, filed on Dec. 19, 2002.

(51) Int. Cl.
*C08L 43/02* (2006.01)
*C08L 43/00* (2006.01)
*C09D 11/10* (2006.01)

(52) U.S. Cl. .................. 524/560; 524/543; 524/547; 524/556; 106/31.13; 106/31.6; 523/160

(58) Field of Classification Search ............... 523/160, 523/161; 524/547, 556, 560, 543; 106/31.13, 106/31.6
See application file for complete search history.

(56) References Cited

U.S. PATENT DOCUMENTS

| 4,390,597 | A | 6/1983 | Chauvel | |
|---|---|---|---|---|
| 4,733,005 | A | 3/1988 | Schmidt et al. | |
| 5,385,960 | A | 1/1995 | Emmons et al. | |
| 5,770,648 | A | 6/1998 | Antonelli et al. | |
| 5,837,776 | A * | 11/1998 | Selvarajan et al. | 525/244 |
| 6,080,802 | A | 6/2000 | Emmons et al. | |
| 6,247,808 | B1 * | 6/2001 | Ma et al. | 347/100 |
| 6,492,451 | B1 * | 12/2002 | Dersch et al. | 524/430 |
| 6,576,051 | B2 | 6/2003 | Bardman et al. | |
| 6,710,161 | B2 * | 3/2004 | Bardman et al. | 528/398 |
| 6,833,401 | B1 * | 12/2004 | Xue et al. | 524/401 |
| 6,890,983 | B2 * | 5/2005 | Rosano et al. | 524/401 |
| 7,009,006 | B2 * | 3/2006 | Brown | 525/326.6 |
| 7,101,921 | B2 * | 9/2006 | Edwards et al. | 523/201 |
| 7,179,531 | B2 * | 2/2007 | Brown et al. | 428/407 |
| 2002/0096088 | A1 | 7/2002 | Bardman et al. | |
| 2003/0018103 | A1 | 1/2003 | Bardman et al. | |
| 2003/0119954 | A1 | 6/2003 | Brown et al. | |
| 2004/0054063 | A1 * | 3/2004 | Brown et al. | 524/500 |

FOREIGN PATENT DOCUMENTS

| EP | 0 330 246 B1 | 8/1989 |
|---|---|---|
| EP | 0615 534 B1 | 4/1997 |
| EP | 1 273 636 A2 | 1/2003 |
| WO | WO 99/25780 A1 | 5/1999 |
| WO | WO 01/05844 | 1/2001 |

* cited by examiner

*Primary Examiner*—Sanza L McClendon

(57) ABSTRACT

A pigmented polymer composition containing colorant particles and polymer particles having phosphorus acid groups is provided. The polymer particles are prepared from the low pH polymerization of phosphorus acid monomer, or alternatively, are substantially free of water soluble polymer bearing phosphorus acid groups. A method for preparing colored coatings from the pigmented polymer composition is also provided. Colored coatings have improved color properties.

7 Claims, No Drawings

PIGMENTED POLYMER COMPOSITION

CROSS REFERENCE TO RELATED PATENT APPLICATIONS

This is a non-provisional application of prior U.S. provisional application Ser. No. 60/435,013 filed Dec. 19, 2002.

This invention relates generally to a pigmented polymer composition containing colorant particles and polymer particles having phosphorus acid groups. The polymer particles are prepared by the polymerization of phosphorus acid monomer. Also provided is a method of preparing a colored coating using the pigmented polymer composition. The pigmented polymer composition is useful as a paint or an ink.

Colorants containing colored pigments are added to provide tint to coating compositions such as paints and semitransparent stains. One factor affecting the amount of colorant added to a coating composition to obtain a desired color is the light scattering efficiency and the light absorbing efficiency of the colored pigments. The scattering and absorbing efficiencies of colored pigments are affected by the extent of dispersion of the colored pigments in the coating composition. Colored pigment particles that are well dispersed and separated from each other are believed to provide increased color and optionally, increased hiding. Such coating compositions can be formulated to a desired color with lower levels of the colored pigments than compositions in which the colored pigments are poorly dispersed. Alternatively, coating compositions having well dispersed colored pigments typically display more intense colors, and permit the preparation of colored coatings with a broader color palette.

U.S. Pat. No. 5,385,960 discloses coating compositions containing latex particles having at least one dihydrogen phosphate functional group and titanium dioxide. The disclosed coating compositions are useful for preparing coatings with improved hiding. In this reference, example D discloses a coating composition further containing lamp black dispersion, which was considered to have an equivalent level of absorption, as in comparative example C. The reference does not disclose latex particles having dihydrogen phosphate functional groups that provide coating compositions with improved color saturation or improved colored pigment efficiency.

Desired are coating compositions suitable for providing colored coatings having a higher degree of color saturation, a measure of color intensity. Alternatively, coating compositions are desired that can be tinted to a desired color with lower level of colorants than conventional coating compositions. Also desired are coating compositions that have less variation in the efficiencies of a range of different colorant particles, to provide consistent colors when mixtures of colorant particles are employed.

The present invention provides select polymer particles having phosphorus acid groups that allow the preparation of colored coatings having increased saturation of color or more pure color, thus allowing the preparation of colored coatings with a broader range of colors. Alternatively, coatings having a desired color can be prepared with lower levels of colorant particles than coatings prepared from conventional compositions. Further, the colorant particles have less variation in their efficiencies in the colored coatings prepared from these select polymer particles.

According to the first aspect of the present invention, a pigmented polymer composition is provided including colorant particles; and polymer particles containing polymerized units of phosphorus acid monomer and having first phosphorus acid groups, wherein the polymer particles are prepared by aqueous emulsion polymerization of the phosphorus acid monomer at a pH of less than 2, or the pigmented polymer composition is substantially free of water soluble polymer bearing second phosphorus acid groups.

A second aspect of the present invention relates to a method for preparing a colored coating including the steps of providing a pigmented polymer composition containing colorant particles, and polymer particles containing polymerized units of phosphorus acid monomer and having first phosphorus acid groups, wherein the polymer particles are prepared by aqueous emulsion polymerization of the phosphorus acid monomer at a pH of less than 2, or the pigmented polymer composition is substantially free of water soluble polymer bearing second phosphorus acid groups; applying the pigmented polymer composition onto a substrate; and drying or allowing to dry the pigmented polymer composition that was applied onto the substrate, to provide the colored polymer composition.

As used herein, the term "(meth)acrylate" refers to either acrylate or methacrylate and the term "(meth)acrylic" refers to either acrylic or methacrylic.

"Glass transition temperature" or "$T_g$" as used herein, means the temperature at or above which a glassy polymer undergoes segmental motion of the polymer chain. Glass transition temperatures of a polymer are estimated by the Fox equation [*Bulletin of the American Physical Society* 1, 3 Page 123 (1956)], as follows:

$$\frac{1}{T_g} = \frac{w_1}{T_{g(1)}} + \frac{w_2}{T_{g(2)}}$$

For a copolymer, $w_1$ and $w_2$ are the weight fraction of the two co-monomers, and $T_{g(1)}$ and $T_{g(2)}$ are the glass transition temperatures, in degrees Kelvin, of the two corresponding homopolymers. For polymers containing three or more monomers, additional terms ($w_n/T_{g(n)}$) are added. Alternatively, the $T_g$ of a polymer phase is calculated by using the appropriate values for the glass transition temperatures of homopolymers, which are found, for example, in "Polymer Handbook", edited by J. Brandrup and E. H. Immergut, Interscience Publishers. The values of $T_g$ reported herein are calculated based on the Fox equation.

As used herein, the term "phosphorus acid group" refers to a phosphorus oxo acid having a POH moiety in which the hydrogen atom is ionizable or to the salt of the phosphorus oxo acid. In its salt or basic form, the phosphorus acid group has a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

The pigmented polymer composition of this invention contains colorant particles and select polymer particles having phosphorus acid groups. Typically, the pigmented polymer composition is an aqueous composition containing the colorant particles and the select polymer particles dispersed in an aqueous medium. The pigmented polymer composition optionally contains other particles including, for examples, white pigments such as titanium dioxide and zinc oxide; and fillers such as clays and calcium carbonates.

The colorant particles contained in the pigmented polymer composition are nonwhite pigments. The colorant particles provide any color other than white to the pigmented polymer composition and to coatings prepared from the pigmented polymer composition. Colorant particles include colored pigments, black pigments, metal effect pigments, and luminescent pigments such as fluorescent pigments and phosphorescent pigments. The term "colorant particles", as used herein excludes white pigment particles such as titanium dioxide, zinc oxide, lead oxide, zinc sulfide, lithophone, zirconium oxide, and antimony oxide. Examples of colors for the pigmented polymer composition include black, magenta, yellow, and cyan, as well as combinations of these colors such as orange, blue, red, pink, green, and brown. Other suitable colors for the pigmented polymer composition include fluorescent colors; metallic colors such as silver, gold, bronze, and copper; and pearlescent pigments. These colors are obtained by employing one or more different types of colorant particles.

The colorant particles include inorganic colorant particles and organic colorant particles. Typically, the colorant particles have average particle diameters in the range of from 10 nanometers (nm) to 50 microns, preferably in the range of 20 nm to 5 microns, and more preferably, in the range of from 40 nm to 2 microns.

Suitable inorganic colorant particles include, but are not limited to, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass. One group of preferred inorganic colorant particles is selected from bismuth pigments; mixed metal oxide pigments; chromate and molybdate pigments; ultramarine pigments; cobalt oxide pigments; nickel antimony titanates; lead chrome; blue iron pigments; carbon black; and metal effect pigments.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

Examples of suitable organic colorant particles and inorganic colorant particles include: Color Index Pigment Yellow 1, 2, 3, 5, 6, 10, 12, 13, 14, 16, 17, 62, 65, 73, 74, 75, 81, 83, 87, 90, 93, 94, 95, 97, 98, 99, 199, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 155, 165, 166, 167, 168, 169, 170, 171, 172, 173, 174, 175, 176, 177, 179, 180, 181, 182, 183, 184, 185, 187, 188, 190, 192, 193, and 194; Color Index Pigment Orange 1, 2, 5, 6, 13, 15, 16, 17, 17:1, 19, 22, 24, 31, 34, 36, 38, 40, 43, 44, 46, 48, 49, 51, 60, 61, 62, 64, 65, 66, 67, 68, and 69; Color Index Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 49:1, 49:2, 49:3, 50;1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264; Color Index Pigment Violet: 1, 2, 3, 5:1, 13, 19, 23, 25, 27, 29, 31, 32, 37, 39, 42, 44, and 50; Color Index Pigment Blue 1, 2, 9, 10, 14, 15:1, 15:2, 15:3, 15:4, 15:6, 15, 16, 18, 19, 24:1, 25, 56, 60, 61, 62, 63, 64, and 66; Color Index Pigment Green 1, 2, 4, 7, 8, 10, 36, and 45; Color Index Pigment Black 6, 7, 10, 11, and 28; and Color Index Pigment Brown 1, 5, 22, 23, 25, 38, 41, and 42.

The polymer particles bear phosphorus acid groups or salts thereof, which are pendant to the polymer backbone and are referred to herein as "first phosphorus acid groups". The polymer particles having first phosphorus acid groups contained in the pigmented polymer composition of this invention are prepared from select processes or from select compositions. These polymer particles are addition polymers prepared by the polymerization of ethylenically unsaturated monomers including at least one phosphorus acid monomer and at least one second monomer.

The phosphorus acid monomer contains at least one ethylenic unsaturation and a phosphorus acid group. The phosphorus acid monomer is alternatively in the acid form or as a salt of the phosphorus acid group. Examples of phosphorus acid monomers include:

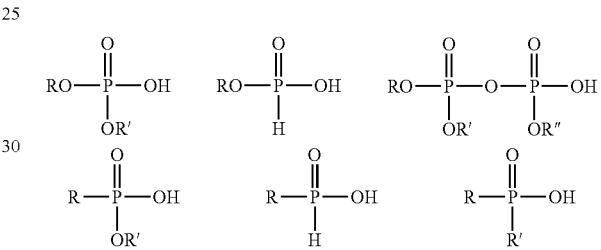

wherein R is an organic group containing an acryloxy, methacryloxy, or a vinyl group; and R' and R" are independently selected from H and a second organic group. The second organic group is alternatively saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl)fumarate or itaconate, derivatives of (meth)acrylic acid esters, such as, for example phosphates of hydroxyalkyl(meth)acrylates including 2-hydroxyethyl (meth)acrylate, 3-hydroxypropyl (meth)acrylates, and the like. Other suitable phosphorus acid monomers are phosphonate functional monomers, such as are disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus acid monomers are 1,2-ethylenically unsaturated (hydroxy)phosphinylalkyl(meth)acrylate monomers, such as are disclosed in U.S. Pat. No. 4,733,005, and include (hydroxy)phosphinylmethyl methacrylate. Preferred phosphorus acid monomers are dihydrogen phosphate monomers, which include 2-phosphoethyl(meth)acrylate, 2-phosphopropyl (meth)acrylate, 3-phosphopropyl(meth)acrylate, and 3-phospho-2-hydroxypropyl(meth)acrylate.

In one embodiment, the polymer particles are prepared from phosphorus acid monomer that is treated prior to polymerization to remove impurities such as saturated compounds containing phosphorus acid groups and salts thereof. Examples of saturated compounds containing phosphorus acid groups include inorganic phosphates, phosphoric acid, phosphorous acid, and 2-hydroxy ethyl ester of phosphoric acid, and their salts.

The second monomer is an ethylenically unsaturated monomer that is, not a phosphorus acid monomer. Suitable second monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$-$C_{40}$ alkyl esters of (meth)acrylic acid; for example, methyl(meth)acrylate, ethyl (meth)acrylate, n-butyl(meth)acrylate, 2-ethylhexyl(meth)acrylate, cyclohexyl(meth)acrylate, n-octyl(meth)acrylate, n-decyl(meth)acrylate, n-dodecyl(meth)acrylate, tetradecyl(meth)acrylate, lauryl(meth)acrylate, oleyl(meth)acrylate, palmityl(meth)acrylate, and stearyl(meth)acrylate; other(meth)acrylates such as isoborny (meth)acrylate, benzyl (meth)acrylate, phenyl(meth)acrylate, 2-bromoethyl(meth)acrylate, 2-phenylethyl(meth)acrylate, and 1-naphthyl(meth)acrylate, alkoxyalkyl (meth)acrylate, such as ethoxyethyl(meth)acrylate, mono-, di-, trialkyl esters of ethylenically unsaturated di- and tricarboxylic acids and anhydrides, such as ethyl maleate, dimethyl fumarate, and ethyl methyl itaconate; and carboxylic acid containing monomers such as (meth)acrylic acid, itaconic acid, fumaric acid, and maleic acid. Alternatively, the second monomer includes at least one multi-ethylenically unsaturated monomer effective to raise the molecular weight and crosslink the polymer particle. Examples of multi-ethylenically unsaturated monomers that are utilizable include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The amounts and types of phosphorus acid monomer and second monomer are typically chosen to provide a pigmented polymer composition with desired properties for an intended application. Suitable glass transition temperatures for the polymer particles having first phosphorus acid groups are in the range of from −60° C. to 120° C., preferably in the range of from −20° C. to 100° C., and more preferably in the range of from −20° C. to 80° C.

In one embodiment, preferred polymer particles having first phosphorus acid groups have a glass transition temperature of at least 35° C., preferably at least 45° C., and more preferably, at least 55° C.

The polymer particles having first phosphorus acid groups useful in the composition of the present invention typically contain as polymerized units, phosphorus acid monomer at levels in the range of from about 0.1 to about 10 weight %, preferably from about 0.5 to about 5 weight %, and more preferably from about 1 to about 3 weight %, based on the weight of the polymer particles having first phosphorus groups. The polymer particles having first phosphorus acid groups typically contain as polymerized units, at least one second monomer at levels in the range of from 90 to 99.9 weight %, preferably from 95 to 99.5 weight %, and more preferably, from 97 to 99 weight %, based on the weight of the polymer particles.

In one embodiment, the polymer particles having first phosphorus acid groups are provided as an aqueous dispersion containing the polymer particles having first phosphorus acid groups dispersed in an aqueous medium. The aqueous medium is characterized as being substantially free of water soluble polymer having phosphorus acid groups. The water soluble polymer having phosphorus acid groups is an addition polymer containing at least two phosphorus acid groups that are alternatively independently located pendant to the backbone of the water soluble polymer or in a terminal position. As used herein, the phosphorus acid groups of the water soluble polymer having phosphorus acid groups are referred to as "second phosphorus acid groups". Contemplated are compositions in which the first phosphorus acid groups and the second phosphorus acid groups are the same, and compositions in which the first phosphorus acid groups and the second phosphorus acid groups are different. At a pH of 3 and above, the water soluble polymer having phosphorus acid groups is a component of the aqueous medium. The water soluble polymer having phosphorus acid groups is alternatively a homopolymer or a copolymer having a degree of polymerization of at least 2. The weight average molecular weight of the water soluble polymer having phosphorus acid groups is preferably at least 10,000, more preferably at least 25,000, and more preferably at least 40,000, as measured by aqueous gel permeation chromatography using a polyacrylic acid standard. In the aqueous polymer dispersion containing the polymer particles having first phosphorus acid groups, the term "substantially free of water soluble polymer" refers to levels of water soluble polymer having second phosphorus acid groups in the aqueous medium defined by ratios of equivalents of second phosphorus acid groups to equivalents of first phosphorus acid group in the range of less than or equal to 1.5, preferably less than or equal to 1, and more preferably, less than or equal to 0.75. In one embodiment, the lower limit for the level of water soluble polymer having second phosphorus acid groups in the aqueous medium is zero equivalents of second phosphorus acid groups.

The level of water soluble polymer having second phosphorus acid groups in the aqueous polymer dispersion containing polymer particles having first phosphorus acid groups is determined by separating the solids from the aqueous polymer dispersion to obtain the aqueous serum phase of the aqueous polymer dispersion. Centrifugation is a suitable separation technique. The serum sample is dried and then dissolved into a solution containing a phosphorus acid control compound such as methyl phosphonic acid, a base such as ammonia, and deuterated water. The concentration of the water soluble polymer having second phosphorus acid groups is determined using phosphorus-31 nuclear magnetic resonance spectroscopy by calculating the ratio of the area of the broad peak for the water soluble polymer containing second phosphorus acid groups to the area of the peak for the phosphorus acid control compound.

The equivalents of first phosphorus acid groups in the polymer particles can be determined from the difference between the equivalents of phosphorus acid monomer used in the preparation of the polymers or alternatively, by titration of an aqueous dispersion containing the polymer particles having first phosphorus acid groups; and the equivalents of water soluble polymer having second phosphorus acid groups.

Although not wishing to be limited to a particular theory, the inventors believe that the aqueous polymerization of phosphorus acid monomer to prepare an aqueous dispersion containing polymer particles having first phosphorus acid groups also results in the formation of water soluble polymer having second phosphorus acid groups. In the preparation of the pigmented polymer composition from an aqueous dispersion of polymer particles having first phosphorus acid groups and colorant particles, the water soluble polymer having second phosphorus acid groups is believed to adversely affect the color properties of colored coatings prepared from the pigmented polymer composition. The water soluble polymer having second phosphorus acid groups is believed to cause bridging flocculation of the colorant particles, which leads to a reduction in the color efficiency of the colorant particles in the dried colored coating. Reduction or elimination of the water soluble polymer having second phosphorus acid groups allows the preparation of colored coatings with improved color properties.

The aqueous medium of the polymer dispersion containing polymer particles having first phosphorus acid groups optionally contains co-solvents including water miscible co-solvents such as methanol, ethanol, propanol, acetone ethylene glycol ethyl ethers, propylene glycol propyl ethers and diacetone alcohol; and water immiscible solvents such as propyl acetate, butyl acetate, methyl isoamyl ketone, amyl acetate, diisobutyl ketone, xylene, toluene, butanol, and mineral spirits. In one embodiment, the aqueous polymer dispersion has 0 weight % co-solvent in the aqueous medium and is referred to as "co-solvent-free". Suitable pH values for the aqueous medium are in the range of from 2 to 12.

The aqueous polymer dispersion, containing polymer particles having first phosphorus acid groups, is prepared by various processes including processes that remove the water soluble polymer having second phosphorus acid groups from a composition containing the polymer particles having first phosphorus groups, and processes that prepare the polymer particles having first phosphorus groups while minimizing the concomitant formation of the water soluble polymer having second phosphorus acid groups.

Various processes are suitable for removing the water soluble polymer having second phosphorus acid groups from the aqueous polymer dispersion containing the polymer particles having first phosphorus acid groups. In one process, the polymer particles are phase separated from the aqueous medium and then the aqueous medium, including the water soluble polymer having second phosphorus acid groups, is removed. Optionally the polymer particles are washed. Next, the polymer particles are re-dispersed into water. The process is optionally repeated one or more times, as needed. Other methods to separate the polymer particles from the aqueous medium include filtration and centrifugation. Other processes to remove the water soluble polymer having second phosphorus acid groups from the aqueous medium include diafiltration, and contacting the aqueous medium with ion exchange resins and then removing the ion exchange resins.

In a further embodiment, the polymer particles having first phosphorus acid groups are prepared by an emulsion polymerization process that minimizes the formation of the water soluble polymer having second phosphorus acid groups. In the process of this embodiment, the polymer particles having first phosphorus acid groups, are prepared by an aqueous emulsion polymerization process at low pH. This low pH polymerization process includes the polymerization of phosphorus acid monomer in an aqueous reaction medium having a low pH. Although not wishing to be limited to a particular theory, the inventors believe that in an aqueous reaction medium at low pH, the phosphorus acid monomer is protonated and is less water soluble than at higher pH. Polymerization of the protonated phosphorus acid monomer leads to increased incorporation of the phosphorus acid monomer into the growing polymer particles and a reduction in the formation of the water soluble polymer having second phosphorus acid groups in the aqueous reaction medium. As used herein, a low pH is a pH of less than 2, preferably less than or equal to about 1.7, and more preferably less than or equal to about 1.5. Suitable pH ranges for the low pH polymerization of the phosphorus acid monomer include pH values in the range of from about −1 to less than about 2, preferably from about −1 to less than about 1.8, and more preferably from about −1 to about 1.5. In one embodiment, the phosphorus acid monomer is polymerized at a pH in the range of from 0 to less than about 1.8, preferably in the range of from 0 to about 1.7, and more preferably in the range of from 0 to about 1.6. The pH of the aqueous reaction medium is adjusted to a low pH by the addition of strong acids, such as sulfuric acid; sulfurous acid; alkyl sulfonic acids, such as methyl sulfonic acid and alkyl ethylene oxide sulfonic acids; aryl sulfonic acids, such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; dihydroxytartaric acid; maleic acid; oxalic acid; and trihydroxybenzoic acid. The strong acid is added to the aqueous reaction medium prior to the complete polymerization of the phosphorus acid monomer, including, for example, prior to the addition of the phosphorus acid monomer, during the addition of the phosphorus acid monomer, and both before and during the addition of the phosphorus acid monomer. Alternatively, the strong acid is added to the aqueous reaction medium after the addition of the phosphorus acid monomer, but prior to the polymerization of the phosphorus acid monomer.

The pH of the aqueous reaction medium is determined using a pH meter equipped with electrodes, such as silver chloride electrodes. The pH measurement is alternatively conducted on the aqueous reaction medium in the reaction vessel or is conducted on an aliquot of the aqueous reaction medium that has been removed from the reaction vessel. The pH measurement is made with the tested sample of the aqueous reaction medium at 20° C. The pH of the aqueous reaction medium is alternatively measured prior to, during, or after the polymerization of the phosphorus acid monomer. A pH measurement after the polymerization of the phosphorus acid monomer is made prior to the addition of substances that change the pH of the aqueous reaction medium.

Suitable aqueous emulsion polymerization processes for preparing the polymer particles having first phosphorus acid groups include single and multiple shot batch processes. If desired, a monomer mixture containing the phosphorus acid monomer is prepared and added gradually to the reaction vessel. Optionally, the monomer composition within the reaction vessel is varied during the course of the polymerization, such as by altering the composition of the monomers being fed into the reaction vessel. Optionally, the monomer mixture is pre-emulsified prior to addition to the aqueous reaction medium with the optional addition of surfactant to aid in the pre-emulsification of the monomer mixture. The monomer mixture optionally contains one or more other materials, including water, solvents, defoamers, and strong acids. The aqueous reaction medium optionally includes water miscible solvents, such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits. Suitable polymerization processes, which include emulsion polymerization and suspension polymerization processes, are conducted as batch, semicontinuous, or continuous processes. Single or multiple stage polymerization techniques are suitable for the low pH process.

Temperatures suitable for the low pH aqueous emulsion polymerization process are in the range of from about 20° C. to less than about 100° C., preferably in the range of from about 40° C. to about 95° C., and more preferably in the range of from about 50° C. to about 90° C. The reaction vessel, containing an initial quantity of water and optionally other synthesis adjuvants, such as surfactants or acid, is typically preheated to a determined temperature prior to the addition of the monomer mixture. Typically, the aqueous reaction medium is agitated to promote mixing. The headspace of the reaction vessel is often flushed with nitrogen or another inert gas to minimize the level of oxygen in the reaction vessel.

The polymerization process for the polymer particles having first phosphorus acid groups optionally employs a seed polymer emulsion to control the number of particles produced by the aqueous emulsion polymerization, as is known in the art. Suitable seed polymer emulsions include polymer emulsions having average particle diameters in the range of from about 10 nm to about 60 nm. Alternatively, the seed polymer particles are prepared by adding an initial quantity of a monomer emulsion to the aqueous reaction medium and polymerizing the added monomer. A technique to control the particle size of the polymer particles is by adjusting the initial surfactant charge, as is known in the art.

A polymerization initiator is typically added to the aqueous reaction medium to initiate polymerization of the ethylenically unsaturated monomers. The polymerization initiator can be added at any time, prior to the addition of the phosphorus acid monomer, after the addition of the phosphorus acid monomer, and during the addition of the phosphorus acid monomer. Examples of suitable polymerization initiators include polymerization initiators that thermally decompose at the polymerization temperature to generate free radicals. Examples include both water-soluble and water-insoluble species. Examples of suitable free radical-generating initiators include persulfates, such as ammonium and alkali metal (potassium, sodium, and lithium) persulfate; azo compounds, such as 2,2'-azobis(isobutyronitrile), 2,2'-azobis(2,4-dimethylvaleronitrile), and t-butyl azocyanocyclohexane; hydroperoxides, such as t-butyl hydroperoxide and cumene hydroperoxide; peroxides, such as benzoyl peroxide, caprylyl peroxide, di-t-butyl peroxide, ethyl 3,3'-di-(t-butylperoxy)butyrate, ethyl 3,3'-di(t-amulperoxy)butyrate, t-amylperoxy-2-ethyl hexanoate, and t-butylperoxy pivilate; peresters, such as t-butyl peracetate, t-butyl perphthalate, and t-butyl perbenzoate; as well as percarbonates, such as di(1-cyano-1-methylethyl)peroxy dicarbonate; and perphosphates.

Polymerization initiators are used alone, and alternatively, as the oxidizing component of a redox system, which also includes a reducing component, such as an acid selected from the group consisting of: ascorbic acid, malic acid, glycolic acid, oxalic acid, lactic acid, and thioglycolic acid; an alkali metal sulfite, more specifically a hydrosulfite, such as sodium hydrosulfite; a hyposulfite, such as potassium hyposulfite; and a metabisulfite, such as potassium metabisulfite; and sodium formaldehyde sulfoxylate.

Suitable levels of initiator and the optional reducing component include proportions of from about 0.001% to about 5% each, based on the weight of the monomers in the monomer mixture to be polymerized. Accelerators such as chloride and sulfate salts of cobalt, iron, nickel, and copper are generally used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents are optionally added to the aqueous reaction medium to control molecular weight of the polymer particle. Examples of chain transfer agents include mercaptans, polymercaptans, and polyhalogen compounds. Examples of suitable chain transfer agents include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to about 10% by weight, based on the weight of the monomers in the monomer mixture, is used to prepare the polymer particles. Other techniques for controlling molecular weight, known in the art, include selecting the ratio of the initiator to total monomer amount.

Catalyst and/or chain transfer agent are optionally dissolved or dispersed in separate or the same fluid medium, and gradually added to the polymerization vessel. Monomer, either neat, dissolved, or dispersed in a fluid medium, is optionally added simultaneously with the catalyst and/or the chain transfer agent. Amounts of initiator and/or catalyst are optionally added to the aqueous reaction medium to "chase" residual monomer after polymerization has been substantially completed, so as to polymerize the residual monomer, as is well known in the polymerization arts.

The aqueous reaction medium typically contains surfactant to stabilize the growing polymer particles during polymerization and to discourage aggregation of the polymer particles in the resulting aqueous polymer dispersion. One or more surfactants, including anionic and nonionic surfactants, and mixtures thereof, is commonly used. Many examples of surfactants suitable for emulsion polymerization are given in *McCutcheon's Detergents and Emulsifiers* (MC Publishing Co. Glen Rock, NF), published annually. Other types of stabilizing agents, such as protective colloids, are optionally used. However, it is preferred that the amount and type of stabilizing surfactant or other type of stabilizing agent employed during the polymerization reaction be selected so that residual stabilizing agent in the resulting aqueous polymer dispersion does not significantly interfere with the properties of the aqueous polymer dispersion, the properties of compositions including the aqueous polymer dispersion, or articles prepared from the aqueous polymer dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units. Suitable nonionic surfactants include, for example, alkyl phenoxypolyethoxy ethanols having alkyl groups of from 7 to 18 carbon atoms and from 6 to 60 oxyethylene units, such as, for example, heptyl phenoxypolyethoxyethanols; ethylene oxide derivatives of long chained carboxylic acids, such as lauric acid, myristic acid, palmitic acid, oleic acid, or mixtures of acids, such as those found in tall oil, containing from 6 to 60 oxyethylene units; ethylene oxide condensates of long chained alcohols such as octyl, decyl, lauryl, or cetyl alcohols, containing from 6 to 60 oxyethylene units; ethylene oxide condensates of long chain or branched chain amines, such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers, such as hydroxyethyl cellulose, methyl cellulose, and polyvinyl alcohol, are also usable.

The low pH polymerization process is suitable for preparing the polymer particles having first phosphorus acid groups with average diameters in the range of from about 10 nm to about 1000 nm, preferably in the range of from about 20 nm to about 700 nm, and more preferably in the range of from about 60 nm to about 500 nm. The low pH polymerization process is suitable for preparing polymer particles having first phosphorus acid groups with molecular weights of at least about 10,000, preferably at least about 50,000, and more preferably at least about 100,000.

Suitable solids ranges for the aqueous dispersion prepared by the low pH polymerization process of this invention include from about 10 to about 70 weight % polymer particles having first phosphorus acid groups, based on the weight of the aqueous dispersion. After polymerization, the pH of the aqueous dispersion is typically adjusted to a pH in the range of from about 3 to about 10.

In one embodiment, the polymer particles having first phosphorus acid groups are multistage polymer particles in which each of the multistage polymer particles include a first polymer and a second polymer. The first polymer contains as polymerized units at least one phosphorus acid monomer and optionally, at least one multiethylenically unsaturated monomer. Further, the first polymer contains first phosphorus acid groups. The second polymer contains as polymerized units at least one ethylenically unsaturated monomer. Preferably the second polymer is substantially free of first phosphorus acid groups. As used herein, substantially free of first phosphorus acid groups" is defined as the weight % of the first phosphorus acid groups in the second polymer, based on the weight of the second polymer, of 10 weight % or less, preferably 5 weight % or less, and more preferably 2 weight % of less, of the weight % of the first phosphorus acid groups in the first polymer, based on the weight of the first polymer. More preferred are second polymers prepared without first phosphorus acid groups. The glass transition temperature of the first polymer is preferably in the range of from −60° C. to 120° C., preferably in the range of from −60° C. to 60° C., and more preferably in the range of from −65° C. to 35° C. The glass transition temperature of the second polymer is preferably in the range of from −60° C. to 35° C. The average weight ratio of the first polymer to the second polymer is in the range of from 1:2 to 1:20.

The pigmented polymer composition of this invention is formed by admixing the colorant particles and the polymer particles having first phosphorus acid groups. The order of addition of the two components is not important. Preferably, the colorant particles are added to an aqueous dispersion containing the polymer particles having first phosphorus acid groups. Generally, mixing is employed to ensure the uniform distribution of the polymer particles and the colorant particles throughout the pigmented polymer composition. The colorant particles are optionally predispersed prior to admixing with the polymer particles. In one embodiment, the colorant particles are added as a dry powder to an aqueous dispersion containing the polymer particles having first phosphorus acid groups dispersed in an aqueous medium. Mixing, including high shear mixing, is optionally used to disperse the colorant particles into the aqueous medium of the polymer particle dispersion. Optionally, one or more dispersants are added to aid in the dispersing of the colorant particles or the stabilization of the colorant particles in the resulting pigmented polymer composition.

The pigmented polymer composition provided as an aqueous dispersion containing the colorant particles and the polymer particles having first phosphorus acid groups is optionally provided as a dry composition by removing water by using freeze drying, spray drying, or other drying techniques. In one embodiment, the pigmented polymer composition is provided as a powder composition. This powder composition is optionally redispersible in water or solvent; or alternatively is useful as a powder coating composition.

In a further embodiment, the pigmented polymer composition is an ink suitable for application by ink jet printing. In this embodiment, the level of colorant pigment is in the range of from 1 to 30 weight %, preferably from 1 to 25 weight %, and more preferably 1 to 20 weight % colorant particles, based on the weight of the pigmented polymer composition. The level of polymer particles having first phosphorus acid groups is in the range of from 1 to 30 weight %, preferably 1 to 20 weight %, and more preferably from 2 to 15 weight %, based on the weight of the pigmented polymer composition. The level of liquid is in the range of from 60 to 98 weight %, based on the weight of the pigmented polymer composition. The composition of this embodiment, optionally contains one or more adjuvants. The liquid is water, solvent, or mixtures thereof. The colorant particles of this embodiment preferably have average particle diameters in the range of from 10 nm to 200 nm and more preferably, in the range of from 10 nm to 80 nm.

In a still further embodiment, the pigmented polymer composition is an aqueous coating formulation suitable for preparing colored coatings having white pigment. The composition of this embodiment is prepared by providing an aqueous base paint composition containing white pigment particles and the polymer particles having first phosphorus acid groups. Preferred white pigment particles are titanium dioxide particles. Next, the colorant particles are admixed into the base paint composition to provide the pigmented polymer composition of this embodiment. The pigmented polymer composition of this embodiment typically contains from 1 to 30 volume % white pigment particles. Typically, the level of polymer particles having first phosphorus acid groups in this pigmented polymer composition is in the range of from 1 to 50 volume %. Optionally, the base paint composition contains binder polymer particles. Suitable binder polymer particles include styrene butadiene polymers, styrene acrylate polymers, (meth)acrylate polymers, polyvinyl chloride polymers, ethylene vinyl acetate polymers, and vinyl acetate polymers. The binder polymer particles generally have an average particle diameter in the range of from about 20 nm to about 1 micron, preferably from about 50 nm to about 600 nm, and more preferably from about 80 nm to about 500 nm.

In still a further embodiment, the pigmented polymer composition is a deep tone paint or colored paint base. The composition of this embodiment contains from 1 to 30 volume % of at least one colorant particles and from 0 to 10 volume % white pigment.

A volatile organic compound ("VOC") is defined herein as a carbon containing compound that has a boiling point below 280° C. at atmospheric pressure. Compounds such as water and ammonia are excluded from the definition of VOC. The VOC level of a composition is the total amount of one or more volatile organic compounds contained in the composition.

Frequently a VOC is deliberately added to a paint or a coating composition to improve film formation of the resulting coating or to aid in the application properties of the composition employed to prepare the coating. Examples of VOCs are glycol ethers, organic esters, aromatic compounds, ethylene and propylene glycols, and aliphatic hydrocarbons. Additionally, the method of paint or coating composition preparation may introduce adventitious VOCs from various ingredients such as an aqueous dispersion containing the polymer particles having first phosphorus acid groups, soaps, biocides, dispersants, and thickeners. These typically account for less than 120 g VOC per liter of the pigmented polymer composition. Additional methods such as steam stripping and choice of low VOC containing additives like biocides, defoamers, soaps, dispersants, and thickeners can be used to further reduce the pigmented polymer composition to less than 5 g VOC per liter of the pigmented polymer composition.

Preferably, the pigmented polymer composition of this invention has a VOC level of less than 150 grams per liter (g/liter) of the pigmented polymer composition; more preferably the pigmented polymer composition has a VOC level of less than 100 g/liter of the pigmented polymer composition; and even more preferably the pigmented polymer composition has a VOC level of less than 50 g/liter of the pigmented polymer composition.

The second aspect of the invention relates to a method of preparing a colored coating using the pigmented polymer composition. This method includes the steps of providing the pigmented polymer composition; applying the pigmented polymer composition to a substrate; and drying or allowing to dry the pigmented polymer composition that was applied onto the substrate, to provide the colored polymer composition. Application methods for applying the pigmented polymer composition to a substrate include conventional methods such as, for example, brushing, rolling, drawdown, dipping, with a knife or trowel, curtain coating, and spraying methods such as, for example, air-atomized spray, air-assisted spray, airless spray, high volume low pressure spray, electrostatic spray, and air-assisted airless spray. The wet coating thickness of the applied pigmented polymer composition is typically in the range of from about 1 micron to about 250 microns. The pigmented polymer composition is applied onto a substrate as a single coat or multiple coats. The applied pigmented polymer composition is allowed to dry at ambient conditions, such as, for example, at from about 0° C. to about 35° C., and in the alternative, dried at elevated temperatures such as, for example, from about 35° C. to about 150° C.

The method of this invention is useful for preparing a colored coating having improved color compared to a colored coating prepared with comparative polymer particles that are not the select polymer particles having first phosphorus acid groups. Improved color refers to a purer color, increased cleanness of color, increase brightness of color, or increased saturation of color.

Generally, the colorants have increased tinting strength in the pigmented polymer composition of this invention. In one embodiment, the method of this invention is useful for preparing a colored coating having a desired color using a lower level of colorant than a colored coating having the same desired color, which was prepare with comparative polymer particles that are not the select polymer particles having first phosphorus acid groups.

The colorant particles in the colored coatings of this invention optionally provide increased hiding compared to comparative colored coatings containing the same quantity of the colorant particles. For colored coatings that also contain white pigment for hiding, such as titanium dioxide, this increase in hiding from the colorant particles allows reformulation of the pigmented polymer composition to decrease the level of white pigment. Reduced levels of white pigment can lower the material costs of coating compositions.

Further benefits of reduced white pigment levels in the pigmented polymer composition, in particular, reduced titanium dioxide levels, is improvement in colorant durability, tint retention, or light fastness, especially in an exterior environment. Titanium dioxide is a photocatalyst and typically, titanium dioxide contained in paints is treated to reduce its photocatalytic activity. The colored coatings of the present invention optionally allow reformulated with lower levels of titanium dioxide as a result of the increased contribution to hiding from the colorant particles. Although not wishing to be limited by theory, the inventors believe that reductions in titanium dioxide levels reduces the photoelectron flux and the concomitant rate of photo-oxidation degradation of colored organic pigments contained in the colored coatings. Further, the polymer particles having first phosphorus acid groups contained in the composition of the present invention are believed to increase the physical separation between individual titanium dioxide particles and other pigment particles. The lower flux of photoelectrons and generated radicals are then dissipated in the polymer particles, thus further lowering the probability of reactions with the colorant particles.

In addition, the composition or the coating of this invention optionally includes other components, including without limitation, other polymers, surfactants, other pigments, extenders, dyes, pearlescents, adhesion promoters, crosslinkers, dispersants, defoamers, leveling agents, optical brighteners, ultraviolet stabilizers, absorbing pigments, coalescents, rheology modifiers, biocides, preservatives, and antioxidants. Optionally, the polymer particles containing air voids or vesiculated polymer particles are included in the pigmented polymer composition or the colored coating. Examples of polymer particles containing one or more voids and vesiculated polymer particles are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422.

The coating of this invention is suitable for application onto various substrates including wood; masonry; cementitious substrates such as concrete, stucco, mortar, and concrete substrates; stone; cellulosic substrates such as paperboard, wallpaper, wall board, and paper; glass; metal; asphalt; leather; plastics such as polyvinyl chloride; and woven and nonwoven material such as cloth, wool, synthetic and natural fibers, and textiles. In addition to providing a coating with improved hiding of the underlying substrate, the coating of this invention is suitable as a protective coating and in the alternative, as an aesthetic coating.

The coatings of the present invention are useful as architectural coatings, such as interior and exterior paint coatings, including masonry coatings, wood coatings and treatments; floor polishes; maintenance coatings such as metal coatings; paper coatings; and traffic coatings, such as those coatings used to provide markings on roads, pavements, and runways.

The following examples are presented to illustrate the composition and the method of the invention. These examples are intended to aid those skilled in the art in understanding the present invention. The present invention is, however, in no way limited thereby.

EXAMPLE 1

Preparation of Aqueous Dispersion Containing Polymer Particles Having First Phosphorus Acid Groups by Low pH Polymerization Process The aqueous dispersion containing the polymer particles having first phosphorus acid groups was prepared by the low pH polymerization process in a 5-liter, four-necked round bottom flask equipped with a paddle stirrer, a thermometer, a nitrogen inlet, and a reflux condenser.

To the flask was added 1100 gram (g) deionized water and 4.5 g concentrated sulfuric acid. The contents of the flask was heated to 85° C. under a nitrogen atmosphere. The pH of the water in the flask was approximately 1. A monomer emulsion (ME-1), which was prepared by mixing 30 g deionized water, 6.0 g of a surfactant having an average composition of lauryl- (ethylene oxide)₄ sodium sulfate (30 weight % solids), 49.5 g butyl acrylate, 31.5 g methyl methacrylate, 0.90 g allyl methacrylate, 3.6 g methacrylic acid, and 4.5 g phosphoethyl methacrylate, was added to the flask. Next, a solution containing 3.6 g sodium persulfate in 20 g deionized water was added. After maintaining the contents of the flask at 85° C. for 15 minutes, 7.0 g ammonium hydroxide was added to the flask to adjust the pH to a value in the range of 2 to 3. A second monomer emulsion (ME-2), which was prepared by mixing 200 g deionized water, 26 g surfactant having an average composition of lauryl-(ethylene oxide)₄ sodium sulfate (30 weight % solids), 352.4 g 2-ethylhexyl acrylate, 441.4 g methyl methacrylate, and 16.2 g methacrylic acid, was added to the flask at a rate of 5 g/minute along with a separate cofeed of a solution of 1.0 g sodium persulfate in 90 g deionized water, while maintaining the contents of the flask at a temperature of 85° C. After 20 minutes, the feed rate of ME-2 was increased to 10 g/minute until the addition of ME-2 was complete. After the complete addition of ME-2 and the sodium persulfate solution, the contents of the flask was maintained at a temperature of 85° C. for 15 minutes and then cooled to room temperature. Next, 12 g ammonium hydroxide were added and the contents of the flask was filtered to remove any coagulum. The resulting dispersion, Example 1.1, had a solids content of 36.7 weight % and a pH of 8.6. The polymer particles having first phosphorus acid groups of Example 1.1 had a first polymer phase containing first phosphorus acid groups and a second polymer phase. The glass transition temperatures of the first polymer phase and the second polymer phase were −3° C. and −9.8° C., respectively. The average particle diameter of the polymer particles of Example 1.1 was 133 nm.

Comparative A

Preparation of Aqueous Dispersion Containing Polymer Particles Having First Phosphorus Acid Groups The aqueous dispersion containing comparative polymer particles having phosphorus acid groups was prepared by a polymerization process wherein the phosphorus acid monomer was polymerization in an aqueous medium with a pH of greater than 2. The polymerization was prepared in a 5-liter, four necked round bottom flask was equipped with paddle stirrer, thermometer, nitrogen inlet, and condenser.

A mixture of 29.1 g of a surfactant having an average composition of lauryl-(ethylene oxide)₄ sodium sulfate (30 weight % solids), 6.7 g ammonium bicarbonate, 90.8 g of an acrylic polymer seed emulsion (average diameter of 100 nm, 45% solids), and 896.9 g deionized water was added to the flask and heated to 80° C. under a nitrogen atmosphere. The pH of the water in the flask was above 2. A monomer emulsion was prepared by mixing 442.3 g deionized water, 66.3 g of a surfactant having an average composition of lauryl-(ethylene oxide)₄ sodium sulfate (30 weight % solids), 989.6 g butyl acrylate, 974.91 g methyl methacrylate, 5.1 g 1-dodecanethiol, and 55.5 g phosphoethyl methacrylate, and 40.8 g of 50 weight % ureido methacrylate. With the contents of the flask at a temperature of 80° C., the following materials were added in order: a mixture of 6.4 g of water, 0.026 g iron sulfate, and 0.019 grams of versene solution. The monomer emulsion was added to the flask while the contents of the flask were maintained at a temperature of 80° C. Two cofeed solutions (4.5 g of 70% tert-butyl hydroperoxide in 117.2 g deionized water and 2.85 g isoascorbic acid in 108.2 g deionized water) were gradually added along with the monomer emulsion addition. When half of the monomer emulsion was added to the flask, 11.1 g of ammonium hydroxide (28%) was added to the isoascorbic acid cofeed solution. After the completion of the monomer addition, a solution of 0.28 g of 70% tert-butyl hydroperoxide in 3.2 g water was added, followed by a solution of 0.18 g isoascorbic acid in 3.2 g water. The resulting dispersion was then cooled to 60° C. While the contents of the flask was allowed to continue to cool, two solutions (0.84 g of 70% tert-butyl hydroperoxide in 18 g deionized water and 0.55 g of isoascorbic acid in 18 g of deionized water) were then added over a period of 20 minutes. Next, a solution of 19.1 g of 28% ammonium hydroxide was added. The contents of the flask was cooled to room temperature. The total amount of water used for rinsing the various containers was 77.3 g. The resulting dispersion was filtered to remove any coagulum. The filtered dispersion, Comparative A, had a pH of 7.5, and 51.1% of solids content.

EXAMPLE 2

Preparation of Base Composition and Comparative Base Composition

A base composition, Example 2, and a comparative pigmented polymer composition, Comparative B, were prepared by combining the ingredients in the order listed in Table 2.1. The base composition contained the polymer particles having first phosphorus acid groups and white pigment. The level of titanium dioxide in Example 2 was chosen to provide approximately the same tint strength by volume for the colorants as in Comparative B.

TABLE 2.1

Preparation of Base Compositions

| Ingredients | Example 2 | Comparative B |
|---|---|---|
| Ti-Pure ™ R-746 titanium dioxide slurry (E.I, DuPont de Nemours and Company) | 23.42 g | 28.53 g |
| Example 1 aqueous dispersion | 29.32 g | — |
| Rhoplex ™ SG-30 binder (Rohm and Haas Company) | 31.99 g | 49.42 g |
| water | 7.57 g | 13.60 g |
| Texanol ™ coalescent (Eastman Chemical, Inc.) | 1.90 g | 1.98 g |
| propylene glycol | 2.47 g | 2.40 g |
| BYK ™-022 defoamer (BYK Chemie GMBH Corp.) | 0.07 g | 0.07 g |
| Acrysol ™ RM-2020 NPR thickener (Rohm and Haas Company) | 2.69 g | 3.36 g |
| Acrysol ™ RM-8W thickener (Rohm and Haas Company) | 0.56 g | 0.64 g |
| pigment volume solids | 15.9% | 20.0% |

Rhoplex™ SG-30 binder is an aqueous dispersion containing butyl acrylate/methyl methacrylate polymer particles without phosphorus acid groups (reported $T_g$=22° C.; 50 weight % solids).

Pigmented polymer compositions of this invention and comparative pigmented polymer compositions were prepared by adding colorant particles to the base compositions of Example 2 and comparative base compositions of Comparative B, respectively. The amount of colorant added to each of the compositions was 20 g per liter. The source of the colorants was Creanova 888 colorants (Creanova, N.J.).

Samples of the colored coatings were prepared by applying the pigmented polymer composition and comparative pigmented polymer composition onto opacity charts (The Leneta Company, Form 5C) with a drawdown bar. Colored coatings were prepare having two different thicknesses. Thin colored coatings were prepared at 38 micron (1.5 mil) wet thickness and then allowing the film to dry for 24 hours. Thick colored coatings were prepared by applying a 76 micron (3 mil) wet thickness film, allowing the film to dry for 24 hours, applying a 38 micron wet film layer over the dried film, and then allowing the double coated sample to dry for 24 hours. The pigmented polymer composition and the comparative pigmented polymer composition were drawn down alongside each other on the same opacity chart.

Color measurements were made with a Gretag Macbeth Color-Eye 2180 colorimeter (Gretag Macbeth) using settings of D65 illuminant with specular included and 10 degree observer; The colorimeter was calibrated with calibration tile 32514121299. The CIE 1931 XYZ coordinates were calculated using Gretag Macbeth ProPalette Formulation Gold version 3.1 software.

Saturation Saturation is defined as "the attribute of a visual sensation which permits a judgment to be made of the degree to which a chromatic stimulus differs from an achromatic stimulus regardless of their brightness" (*Color Science*, Wuszecki and Stiles, Wiley, (2000)). The CIE 1976 (L*u*v*)-space can be used as a correlate for saturation:

$$s^*_{uv} = 13[(u' - u'_n)^2 + (v' - v'_n)^2]^{1/2}, \text{ wherein } u' = \frac{4X}{X + 15Y + 3Z},$$

$$v' = \frac{9Y}{X + 15Y + 3Z}, u'_n = \frac{4X_n}{X_n + 15Y_n + 3Z_n}, \text{ and } v'_n = \frac{9Y_n}{X_n + 15Y_n + 3Z_n}.$$

The tristimulus values $X_n$, $Y_n$, and $Z_n$ are those of the nominally white object-color stimulus. The CIE standard illuminant D65 with $Y_n$=100, $X_n$=95.3, and $Z_n$=105.6 was used. The larger the value for $s^*_{uv}$ the greater the saturation. The saturation values listed in Table 2.2 were calculated from measurements of the thick colored coating samples over the white section of the opacity chart.

TABLE 2.2

Saturation Values ($s^*_{uv}$) for the Colored Coatings and Comparative Colored Coatings

| Colorant Particles | Example 2 | Comparative B |
|---|---|---|
| lamp black | 0.130 | 0.128 |
| phthalo blue | 0.538 | 0.523 |
| phthalo green | 0.434 | 0.425 |
| red iron oxide | 0.510 | 0.492 |
| magenta | 0.366 | 0.354 |
| fast red | 0.270 | 0.264 |
| brown oxide | 0.186 | 0.183 |
| yellow oxide | 0.394 | 0.381 |
| exterior yellow | 0.454 | 0.443 |

The results in Table 2.2 show that for each of the colorants, the colored coatings of this invention (Example 2) had larger saturation values compared to the comparative colored coatings, indicating increased saturation of color for the colored coatings prepared from the composition of this invention.

Relative Scattering and Absorption Coefficients

The relative scattering and absorption coefficients of the colored coatings and the comparative color coatings were calculated from the X, Y, and Z reflectance values using the following equations:

$$SX = \frac{R_\infty}{(1 - R_\infty^2)} \ln\left(\frac{1 - R_0 R_\infty}{1 - R_0 / R_\infty}\right) \quad KX = \frac{(1 - R_\infty)^2}{2(1 - R_\infty^2)} \ln\left(\frac{1 - R_0 R_\infty}{1 - R_0 / R_\infty}\right)$$

wherein SX and KX are the relative scattering coefficient and the relative absorption coefficient, respectively. The value of $R_0$ was the smallest of the X, Y, or Z readings of the thin colored coatings over the black portion of the opacity chart. The value of $R_\infty$ was based on the same X, Y, or Z coordinate used for $R_0$, measured on the thick colored coating over the white portion of the opacity chart.

TABLE 2.3

Relative Scattering Coefficients and Relative Absorption Coefficients

| | Example 2 SX | Comparative B SX | Example 2 KX | Comparative B KX |
|---|---|---|---|---|
| lamp black | 3.36 | 2.55 | 1.20 | 0.88 |
| phthalo blue | 3.32 | 3.09 | 0.75 | 0.67 |
| phthalo green | 3.92 | 4.33 | 0.77 | 0.83 |
| red iron oxide | 2.88 | 2.79 | 1.31 | 1.18 |
| magenta | 3.71 | 3.81 | 0.53 | 0.52 |
| fast red | 4.45 | 4.35 | 0.36 | 0.34 |
| brown oxide | 5.01 | 3.78 | 1.16 | 0.84 |
| yellow oxide | 4.83 | 4.26 | 0.97 | 0.80 |
| exterior yellow | 6.57 | 4.18 | 1.19 | 0.72 |
| average | 4.23 | 3.68 | 0.92 | 0.75 |

The results in Table 2.3 show that the colored coatings of this invention had increased light scattering and increase light absorption compared to the comparative colored coatings. These results indicated improved efficiency of the colorants in the colored coating of this invention to provide color.

Apparent Tint Strength and Rubup Values

The apparent tint strengths of the colored coatings were calculated from the equation:

$$\text{Apparent Strength} = \frac{Y_{con}(100 - Y_{exp})^2}{Y_{exp}(100 - Y_{con})^2}$$

wherein $Y_{exp}$ and $Y_{com}$ are the Y values of the colored coating samples of this invention and the comparative colored coating samples, respectively. A value of 1 indicates that the colorant particles provide the same tinting strength in the colored coating of this invention and the comparative colored coating.

The apparent strength rubup values were determined by rubbing the colored coatings with a finger and then measuring the Y values for the rubup region of the colored coating. The apparent strength rubup values were calculated according to the above equation for apparent strength. The rubup values provided a measure of the potential apparent strengths of colorants in a coating. A value of 1 indicates that the colorant particles provide the same tinting strength after rubup in the colored coating of this invention and the comparative colored coating.

Also calculated were the actualized tint strengths of the colorants according to the equation:

$$\text{Actualized Strength} = \frac{Y_{initial}(100 - Y_{rubup})^2}{Y_{rubup}(100 - Y_{initial})^2}$$

wherein $Y_{initial}$ and $Y_{rubup}$ are the Y values of the colored coating samples prior to and after rubup, respectively. The actualized tint strengths compare the initial tinting strength of the colored coating prior to rubup and the tinting strength after rubup. Values of less than 1 for the actualized tinting strength indicated that the colorants in the colored coating were not at their full potential colorant efficiency. Actualized strengths were measured for both the colored coating samples of this invention and for the comparative coating samples.

TABLE 2.4

Apparent Tinting Strength and Actualized Tinting Strength

| Colorant Particles | Apparent Strength | Apparent Strength (Rubup) | Actualized Strength | Actualized Strength (comparative) |
|---|---|---|---|---|
| lamp black | 1.04 | 1.03 | 0.91 | 0.89 |
| phthalo blue | 1.04 | 1.05 | 0.99 | 1.00 |
| phthalo green | 1.02 | 0.95 | 0.94 | 0.88 |
| red iron oxide | 1.06 | 1.09 | 0.95 | 0.97 |
| magenta | 1.06 | 1.05 | 0.94 | 0.94 |
| fast red | 1.03 | 0.96 | 0.93 | 0.87 |
| brown oxide | 1.04 | 1.10 | 0.92 | 0.98 |
| yellow oxide | 1.04 | 0.88 | 0.94 | 0.79 |
| exterior yellow | 1.00 | 1.04 | 0.98 | 1.02 |
| average | 1.04 | 1.02 | 0.94 | 0.93 |
| standard deviation | 0.02 | 0.07 | 0.03 | 0.07 |

The apparent strength values and the apparent strength rubup values in Table 2.4 were close to values of 1 and indicated that the colorants had similar tinting strengths in the colored coatings of this invention and the comparative colored coatings, although the colored coatings contained a lower level of titanium dioxide white pigment than the comparative colored coating. The actualized strength values for the colored coating of this invention (average value of 0.94) and for the comparative colored coating (average value of 0.93) show that the colorants in the colored coating and the comparative colored coating were not at their full potential colorant efficiency. Further, the variation in the actualized strength values for the different colorant particles was greater in the comparative colored coating (standard deviation of 0.07) compared to the colored coating of this invention (standard deviation of 0.03). This indicated that in the colored coating of this invention, which was prepared from the pigmented polymer composition containing the polymer particles having first phosphorus acid groups, the different colorant particles had less variation in their tinting strength, than in the comparative colored coating. Less variation in tinting strength between colorants is important in preparing a palette of different colored coatings in which two or more colorants are used.

EXAMPLE 3

Comparative Pigmented Polymer Composition Containing Comparative Polymer Particles Having Phosphorus Acid Groups A base composition, Comparative C, was prepared containing comparative polymer particles having phosphorus acid groups, which were prepared by polymerization at a pH above 2, and white pigment. The ingredients in Table 3.1 were combined in the order listed. A second base composition, Comparative D, was prepared containing polymer particles that did not contain phosphorus acid groups.

TABLE 3.1

Preparation of Base Compositions.

| Ingredients | Comparative C | Comparative D |
|---|---|---|
| Comparative A aqueous dispersion | 2355.90 g | — |
| Rhoplex ™ SG-30 binder (Rohm and Haas Company) | — | 2405.15 g |
| Ti-Pure ™ R-746 titanium dioxide slurry (E.I, DuPont de Nemours and Company) | 1057.95 g | 1057.95 g |
| water | 361.37 g | 361.37 g |
| propylene glycol | 154.17 g | 154.17 g |
| Texanol ™ coalescent (Eastman Chemical, Inc.) | 60.43 g | 60.13 g |
| Aerosol ™ OT-75 surfactant (Cytec Technology Corp., DE) | 4.46 g | 4.46 g |
| BYK ™-022 defoamer (BYK Chemie GMBH Corp.) | 6.68 g | 6.68 g |
| ammonia (28%) | 4.46 g | 4.46 g |
| Acrysol ™ RM-2020 NPR thickener (Rohm and Haas Company) | 39.21 g | 65.05 g |
| Acrysol ™ SCT-275 thickener (Rohm and Haas Company) | 13.37 g | 58.37 g |
| water | 395.31 g | 274.28 g |
| pigment volume solids | 16.0% | 16.0% |

Comparative pigmented polymer compositions were prepared by admixing 3.8 g of colorant into the base compositions. The source of the colorants were 888 Colortrend colorants (Huls America, Inc., NJ). Samples of comparative colored coatings were prepared by first applying the comparative pigmented polymer compositions onto opacity charts using a 76 micron (3 mil) drawdown bar, allowing the wet films to dry for 12 hours, and applying a 38 micron (1.5 mil) wet thickness layer of comparative pigmented polymer compositions. While the films were still wet, rubup was performed. The double coated samples were dried for 24 hours prior to color measurements.

The apparent tint strengths of the comparative colored coatings were calculated from the equation:

$$\text{Apparent Strength} = \frac{Y_D(100 - Y_C)^2}{Y_C(100 - Y_D)^2}$$

wherein $Y_C$ and $Y_D$ are the Y values of the comparative colored coating samples prepared from Comparative C and Comparative D, respectively.

Also calculated were the actualized tint strengths of the colorants according to the equation in Example 2.

TABLE 3.2

Tinting Strengths of Comparative Colored Coatings

| Colorant Particles | Apparent Strength | Apparent Strength (Rubup) | Actualized Strength (Comparative C) | Actualized Strength (Comparative D) |
|---|---|---|---|---|
| lampblack | 0.665 | 0.943 | 1.469 | 1.037 |
| phthalo blue | 0.800 | 0.926 | 1.162 | 1.004 |
| phthalo green | 0.820 | 0.881 | 1.130 | 1.051 |

TABLE 3.2-continued

Tinting Strengths of Comparative Colored Coatings

| Colorant Particles | Apparent Strength | Apparent Strength (Rubup) | Actualized Strength (Comparative C) | Actualized Strength (Comparative D) |
|---|---|---|---|---|
| red iron oxide | 0.780 | 1.004 | 1.266 | 0.984 |
| magenta | 0.892 | 0.980 | 1.118 | 1.017 |
| fast red | 0.890 | 0.975 | 1.148 | 1.048 |
| brown oxide | 0.858 | 0.990 | 1.132 | 0.982 |
| average | 0.815 | 0.957 | 1.204 | 1.018 |
| standard deviation | 0.079 | 0.043 | 0.127 | 0.029 |

The apparent strength values and the apparent strength rubup values comparing the two comparative colored coatings in Table 3.2 show a large change in the tinting strength as a result of rubup. The average apparent strength value of 0.815 changed to an average apparent strength rubup value of 0.957. The average apparent strength rubup value was close to value of 1, indicating fuller development of the colorant in the rubup samples. The actualized strength values show that the comparative colored coatings prepared from the comparative polymer particles having phosphorus acid groups of Comparative A, showed large decreases in tint strength as a result of rubup. The actualized strength of 1.204 was an approximately 20% decrease in tint strength from rubup, indicating poor colorant particle dispersion in the comparative colored coating. Further, the variation in the actualized strength values for the different colorant particles in these comparative colored coatings was 0.127, which was larger than the variation for Example 2. The results indicate that the colored coating prepared with polymer particles having first phosphorus acid groups that are polymerized by the low pH process has better color acceptance than the comparative polymer particles having phosphorus acid groups that are not polymerized by the low pH process.

What is claimed is:

1. A polymer composition comprising:
   organic colorant particles; and
   polymer particles comprised of polymerized units of phosphorus acid monomer and having first phosphorus acid groups, wherein:
   i) said polymer particles are prepared by aqueous emulsion polymerization of said phosphorus acid monomer at a pH of less than 2, or
   ii) said polymer composition comprises a level of water soluble polymer having second phosphorus acid groups defined by ratios of equivalents of second phosphorus acid groups to equivalents of first phosphorus acid groups in the range of less than or equal to 1.5,
   wherein each of said polymer particles are multistage polymer particles comprising:
   a) a first polymer comprising:
      a polymerized unit of a multiethylenically unsaturated monomer,
      polymerized units of said phosphorus acid monomer, and
      said first phosphorus acid groups,
   wherein said first polymer has a glass transition temperature in the range of from −60° C. to 35° C.; and
   b) a second polymer having a glass transition temperature in the range of from −60° C. to 35° C., wherein a weight % of the first phosphorus acid groups in said second polymer, based on a weight of said second polymer, is 10 weight % or less of a weight % of the first phosphorus acid groups in said first polymer, based on a weight of the first polymer and wherein the average weight ratio of said first polymer to said second polymer is in the range of from 1:2 to 1:20.

2. The polymer composition according to claim 1 further comprising white pigment.

3. The polymer composition according to claim 1 comprising 1 to 30 volume % white pigment particles, based on a total dry weight of said polymer composition.

4. The polymer composition according to claim 1 comprising from 0.1 to 30 volume % said colorant particle and from 1 to 50 volume % said polymer particle, based on the total dry weight of said polymer composition.

5. The polymer composition of claim 1 wherein said colorant particles comprise nonwhite pigments.

6. The polymer composition of claim 1 wherein said polymer composition comprises a level of water soluble polymer having second phosphorus acid groups defined by ratios of equivalents of second phosphorus acid groups to equivalents of first phosphorus acid groups in the range of less than or equal to 1.5.

7. An inkjet ink composition comprising the polymer composition of claim 1.

* * * * *